Dec. 24, 1940.  L. H. STEIN  2,225,758
OIL SEAL
Filed Dec. 5, 1938
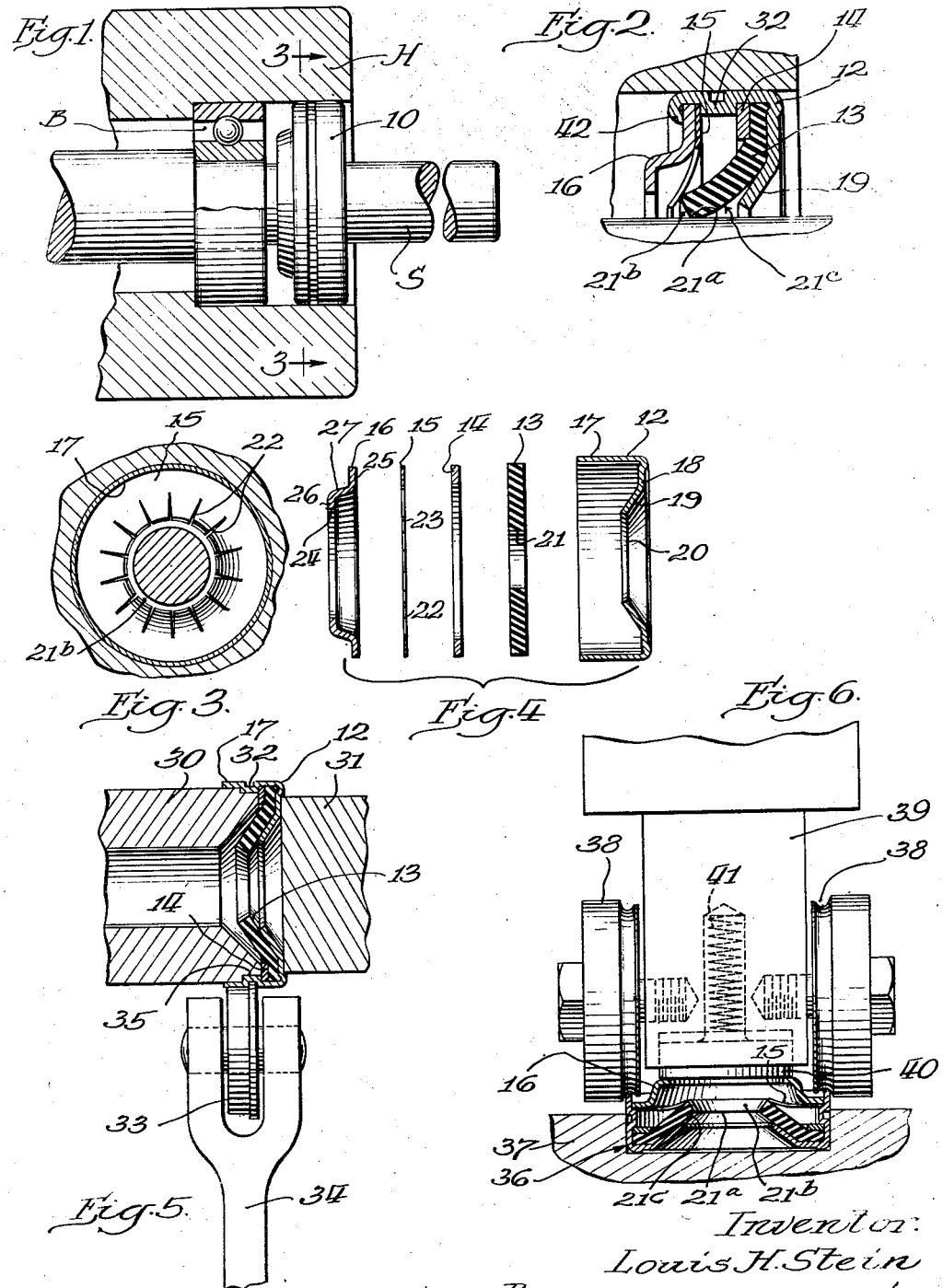
Inventor:
Louis H. Stein Patented Dec. 24, 1940

2,225,758

UNITED STATES PATENT OFFICE 2,225,758

OIL SEAL

Louis H. Stein, Chicago, Ill., assignor to Aetna Ball Bearing Manufacturing Company, Chicago, Ill., a corporation of Illinois Application December 5, 1938, Serial No. 243,905

9 Claims. (Cl. 288—3)

My invention relates to oil seals for rotary shafts, and especially—although not necessarily—to oil seals of the annular self-contained type slipped over the shaft with the casing of the seal pressed into a seat in the housing and generally used adjacent an anti-friction bearing to keep the lubricant therefor from passing out of the housing where the shaft protrudes.

One object of my invention is an improved arrangement of spring member for pressing the flexible sealing element or packing into contact with the shaft in such manner that the spring pressure is made more effective.

Another object is separate and more or less independent mountings of the sealing element and of its spring in the shell, and preferably spaced-apart mountings thereof.

Another object is a mounting and disposition of the sealing element or washer in such a manner as to facilitate the entrance of the shaft end from either end of the oil seal unit.

Still another and general object is an improved and more economical construction of oil seal.

My invention is also concerned with an improved method and apparatus for forming and assembling an oil seal.

The foregoing together with further objects, features, and advantages of my invention are set forth in the following description of a specific embodiment thereof and illustrated in the accompanying drawing in which:

Fig. 1 is an elevation of a typical installation of my oil seal, the housing and a portion of the bearing being broken into radial section;

Fig. 2 is a radial section of the oil seal of Fig. 1 on an enlarged scale;

Fig. 3 is a transverse section through the oil seal taken on the line 3—3 of Fig. 1;

Fig. 4 is an "exploded" section through the individual pieces which are assembled to form the oil seal;

Fig. 5 illustrates somewhat diagrammatically the apparatus and method employed in the first shell spinning operation of assembly; and Fig. 6 is an elevation, partly in section, of the apparatus for effecting the second and final shell spinning step in assembly.

In Fig. 1 I have shown a conventionalized typical installation of my oil seal. A shaft S passing through the tubular bore of a housing H is journaled therein in part by a ball bearing unit B. The oil seal 10 of my invention annularly embraces the shaft and has a press fit in the bore of the housing outwardly of the ball bearing. The oil seal serves to prevent the lubricant in the housing for the bearing from passing out of the housing where the shaft protrudes. It will be understood, however, that my oil seal may be used for holding back liquid or gaseous fluids other than lubricant, and it is not necessarily used in connection with a bearing.

My completed oil seal is best shown in the section of Fig. 2, but for a better understanding of its construction, I shall first describe it in terms of its assembly.

Referring to Fig. 4, the oil seal unit is made up from five pieces, namely, a shell 12, a packing or sealing element 13, a clamping washer 14, a spring member 15, and a closure or guard 16. In Fig. 4 these parts are shown as they are preformed prior to assembly.

The shell 12 is cup-shaped, having a cylindrical flange 17 and a web 18, which is conically flanged inwardly at 19 about the margins of its central opening 20 which is a little larger than the diameter of the shaft.

The sealing element or packing 13 is originally a flat ring cut from sheet stock of synthetic rubber, or optionally rawhide, where it is to be used with ordinary lubricants, although other suitable flexible—and preferably resiliently flexible—material may be used in connection with other fluids. The overall diameter of the element 13 is approximately the same as the inside diameter of the flange 17 of the shell, and the central opening 21 is of a diameter somewhat less than that of the shaft.

The spring member 15 is cut from very thin sheet spring steel with arcuately spaced radial slits 22 (see Fig. 2) extending inwardly from its central opening 23, which central opening may be of a diameter originally very slightly greater than that of the shaft.

The closure or front wall 16, which also serves as a guard, is dished into much the form of a pie tin, except that the bottom has an opening 24 of considerably greater diameter than that of the shaft. The closure thus presents an outer flat ring portion 25, an inner flat ring portion 26, axially offset therefrom, and an interconnecting portion 27. The outer diameter of the closure 16, like that of the pieces 13, 14 and 15, is such as will fit the inside diameter of the cylindrical flange 17 of the shell.

As the first step in assembly of the several pieces of Fig. 4 into the sealing unit, the sealing element 13 is inserted in the cup-shaped shell against the back wall 18 thereof and the clamping washer 14 placed against the seal on the opposite side thereof. The three pieces thus assembled are placed in a lathe or similar machine diagrammatically illustrated in Fig. 5. An annular die member 30 carried by the lathe chuck is conformed to fit inside the cylindrical flange of the shell and to bear against the clamping washer, while a tail piece 31, which may be mounted to rotate also, bears against the back wall 18 of the shell.

Axial thrust is applied between the die member 30 and tail 31 to compress the interposed margin of the sealing element 13. While in this relationship an internal bead 32 is formed in the cylindrical flange 17 of the shell by a roller 33 mounted in the bifurcated end of a shank 34, which may be supported on the tool holder of the lathe. The contour of the internal bead 32 is defined by a reduced margin 35 in the periphery of the die member 30 adjoining its end. The clamping washer 14 on the one side and the shoulder of the reduced margin 35 on the other side act as dies to insure that the metal flow under pressure of the roller 33 will give the internal bead square-cornered shoulders which tend to hold the parts in more perfect alignment.

The operation illustrated in Fig. 5 mounts the sealing element 13 securely and quite permanently in the shell and quite apart from any subsequent operations. The conically disposed flange 19 of the shell causes the sealing element 13 to assume a corresponding frusto-conical position, but even in this position the diameter of the central opening 21, although somewhat enlarged, is still smaller than that of the shaft.

As the next step in assembly, the pre-assembly of Fig. 5 is removed from the lathe and seated with its open side up in a shallow cylindrical depression 36 in the table 37 of the rotary press illustrated in Fig. 6. Then the spring member 15 is set within the flange 17 of the shell with its margins resting on the shoulder of the internal bead 32 and the end closure 16 is set thereon with its dished flange 26 uppermost. This leaves a short length of the cylindrical flange 17 protruding above the flange 25 of the closure.

The protruding edge of the flange 17 is crimped inwardly upon the marginal flange 25 of the closure 16 by a plurality of crimping rollers 38 carried by a rotary vertical shaft 39 depending from the press of Fig. 6 and with the axes of the rollers arranged radially thereof. A plunger 40 pressed by a spring 41 is mounted in the bottom end of the shaft 39 to hold the superposed closure 16 and spring element 15 against the bead during the inbeading of the upper end of the flange 17.

In the completed seal, as shown in Fig. 2, the end closure 16 and the spring member 15 are permanently locked in the shell between the adjacent shoulder of the bead 32 and the inbeading 42 of the shell. This mounting of the closure and spring member is separate from and quite independent of the mounting of the sealing element 13.

After the seal is assembled as a unit, but before it is put upon a shaft, the sealing element and the spring member assume the relative position shown in Fig. 6. The inner margin of the spring member is pressed against the inner margin of the sealing element, and because the latter is held in a frusto-conical position by the conically inner marginal flange 19 of the shell, the inner margin of the spring element is caused to flex upwardly, which is possible by virtue of the slits 22. In this position the spring member supplements the resilience of the sealing element in maintaining it in its frusto-conical position.

It will be observed from the arrangement of the seal in Fig. 6 that before it is placed upon a shaft, the smallest diameter of the central opening in the sealing element is the circle 21a formed by the annular junction of the inner edge face of the central opening of the sealing member and its back face which abuts the flange 19 of the shell. It is further pointed out that from this circle 21a both the inner edge face 21b and the rearward face 21c extend in angular relation to the axis of the seal. In other words, the seal presents to the shaft an annular chamfer from both ends of the seal. This feature is of great advantage in facilitating the application of the seal to the shaft, whether the shaft end is inserted at the convex end or at the concave end of the seal.

In an installation such as illustrated in Fig. 1, the end of the shaft must be applied from the closure or convex end of the seal. In that case it is preferable, although not essential, that the end of the shaft be rounded or chamfered, as illustrated, to facilitate passing the end of the shaft through the circle 21a, which is of definitely smaller diameter than the shaft. But whether or not the end of the shaft be chamfered or rounded, the angular or chamfer-like conformation of the inner edge 21b of the sealing element greatly facilitates the insertion of the end of the shaft from the convex end of the seal.

After the shaft is inserted, the seal is slid along the shaft into the bore of the housing H and the periphery of the shell is of such a diameter that it makes a tight fit with the bore when pressed thereinto. The seal is thus held in the position shown in Fig. 1.

With the shaft inserted in the seal, the sealing element and the spring element change their positions somewhat over that which they occupy in the completed but unmounted seal, which position is illustrated in Fig. 6. From a comparison of Fig. 2 with Fig. 6, it will be seen that the enlarging of the circle 21a to accommodate the diameter of the shaft, results in a greater axial displacement of the central opening of the sealing element, and this in turn curves the sealing element away from contact with the flange 19 of the shell, especially adjacent the central opening 20 thereof. The flange 19 still serves as a closure for the end of the seal and as a guard for the sealing element 13, but it does not embrace the adjacent face of the sealing element so closely but that the sealing element may still be pressed closer as the material of the sealing element wears down at the region of the circle 21a.

After a short period of operation, the sharp edge at the circle 21a will be flattened out by wear to a narrow flattened surface parallel with the shaft, but it will continue to be only a relatively narrow surface, thus reducing friction and attendant heat which would tend to deteriorate the material of the seal and cause excessive wear, as well as additional resistance to rotation of the shaft.

Further comparing the position of the parts as between Fig. 2 and Fig. 6, it will be seen that the fingers defined by the slits 22 in the spring member 15 are flexed axially still further when the shaft is inserted. The spring fingers bear against the salient annular edge formed by the edge face 21b of the sealing element and the adjacent side of the sealing element. The pressure exerted on the sealing element by the spring fingers is in a direction which affords both an inward radial component and an axial component. The radial component presses the sealing element against the shaft to accomplish the primary purpose of a seal, while the axial component resists any tendency of the sealing element to spread axially further away from the flange 19.

Particular attention is called to the advantage of mounting the spring member at an axially spaced distance from the sealing element as compared with the more usual practice of mounting the spring member parallel with and adjacent the sealing element. If the spring member were mounted between the clamping washer 14 and the sealing element 13, it would lie along and parallel with the adjacent face of the sealing element throughout its radial length. In that case the pressure of the spring member upon the sealing element adjacent the central opening therein, would be less effective because it would be resisted throughout its radial length by its contact with the sealing element. By my mounting of the spring member at an axially spaced distance away from the mounting of the sealing element, all of the pressure of the spring member is concentrated upon the sealing element at the margin of its central opening and, therefore, the spring pressure is considerably more effective in pressing the sealing element against the shaft at the region of the circle 21a.

The end closure 16 is forwardly dished to provide room for the axial displacement of the sealing element and spring member, and the closure 16 also extends close enough to the shaft to serve as a guard to prevent injury or outside contact with the spring member.

The generous curve, by which the rim 25 of the closure 16 is turned into its more or less cylindrical or frusto-conical portion 27, presents a rounded annular fulcrum for the flexing of the spring member or disc 15. This precludes danger of breaking the sheet spring steel stock which would be present if it were bent about a sharp corner. If, instead of being mounted a spaced distance from the mounting of the sealing element or disc, the spring disc were mounted between the sealing disc and its washer 14, the spring disc might be broken or permanently set by being pressed, by the compressed sealing disc, against the sharp corner of the washer.

My seal still preserves the advantage that in the event it is used in an application where it is to hold back fluid under pressure, the fluid pressure will tend to increase rather than break the sealing pressure.

While I have described and illustrated this specific embodiment of my invention, I contemplate that substitutions and changes may be made without departing from the scope and spirit of my invention.

I claim:

1. A shaft seal of the type disclosed comprising, a shell, a back wall for the shell, a front wall for the shell, a sealing disc mounted in the shell adjacent the inner face of one wall, a spring disc mounted in the shell adjacent the inner face of the other wall with a space between the discs at their mountings, and axial openings in the walls and discs for passage of a shaft with the margin of the opening in the sealing disc flexedly displaced in the same axial direction from the mounting thereof and in sealing engagement with the shaft, the spring disc adjacent the opening bearing against the sealing disc only at the margin of the latter's axial opening to urge the sealing disc into contact with the shaft, the discs, in radial section, being in crescent-cusp relation adjoining their central openings.

2. A shaft seal of the type disclosed comprising, a shell, a back wall for the shell, a front wall for the shell, a sealing disc mounted in the shell adjacent the inner face of one wall, a spring disc mounted in the shell adjacent the inner face of the other wall with a space between the discs at their mountings, and axial openings in the walls and discs for passage of a shaft with the margin of the opening in the sealing disc axially displaced from the mounting thereof and in sealing engagement with the shaft, the spring disc adjacent the opening bearing non-tangentially against the sealing disc and only at the margin of the latter's axial opening to press thereagainst in an oblique direction having axial and inward radial components, the central portions of the discs being fixed in the same axial directions.

3. A shaft seal comprising, a shell, a sealing disc mounted near its periphery in the shell, a spring disc mounted near its periphery in the shell but at an axially spaced distance from the mounting, axial holes in the discs for passage of the shaft, the sealing disc at the margin of its opening having annular sealing contact with the shaft and the shaft holding the sealing disc flexed, in radial section, toward the spring disc, the spring disc contacting the sealing disc only adjacent the latter's opening to urge it against the shaft, the central portions of the discs being flexed in the same axial direction.

4. A shaft seal comprising, a shell, a sealing disc mounted near its periphery in the shell, a spring disc mounted near its periphery in the shell, an internal bead in the shell spacing the discs at their mountings in the shell, axial holes in the discs for passage of the shaft, the sealing disc at the margin of its opening having annular sealing contact with the shaft and the shaft holding the sealing disc flexed, in radial section, toward the spring disc, the spring disc contacting the sealing disc only adjacent the latter's opening to urge it against the shaft, the central portion of the discs being flexed in the same axial directions.

5. A shaft seal comprising, a cylindrical shell, a back wall for the shell, a front wall for the shell, a washer mounted within the shell intermediate the walls, a flexible sealing disc clamped adjacent its periphery within the shell against the back wall and by and between the back wall and the washer, a spring disc mounted adjacent its periphery intermediate the washer and the front wall, axial openings in the walls and discs for passage of a shaft, the opening in the sealing disc being of normally smaller diameter than the shaft whereby the shaft expands the opening and axially displaces it by flexure of its body, the spring disc being fingered from its central opening and centrally flexed into axial displacement in the same axial direction by contact with the sealing disc, the spring disc pressing against the sealing disc only adjacent the openings of the discs.

6. A shaft seal comprising, a cylindrical shell, a back wall for the shell, a front wall for the shell, a washer mounted within the shell intermediate the walls, a flexible sealing disc clamped adjacent its periphery within the shell against the back wall and by and between the back wall and the washer, a normally substantially flat spring disc mounted adjacent its periphery intermediate the washer and the front wall and spaced from the sealing disc at the mountings of the discs, axial openings in the walls and discs for passage of a shaft, the opening in the sealing disc being of normally smaller diameter than the shaft whereby the shaft expands the opening and axially displaces it by flexure of its body, the spring disc being fingered from its central opening and centrally flexed into axial displacement in the same axial direction by contact with the sealing disc, the spring disc pressing against the sealing disc only adjacent the openings of the discs.

7. A shaft seal comprising, a cylindrical shell, a back wall for the shell, a flexible sealing disc clamped adjacent its periphery within the shell against the back wall and by and between the back wall and the washer, a spring disc mounted adjacent its periphery within the shell but on the opposite side of the washer and thereby spaced from the sealing disc, axial openings in the walls and discs for passage of a shaft, the opening in the sealing disc being of normally smaller diameter than the shaft whereby the shaft expands the opening and axially displaces it by flexure of its body, the spring disc being fingered from its central opening and centrally flexed into axial displacement in the same axial direction as the flexure of the sealing disc by contact with the sealing disc, the spring disc pressing against the sealing disc only adjacent the openings of the discs and in oblique relation to the annular corner formed by the inner face and the central opening of the sealing disc.

8. An oil seal comprising, a shell formed of sheet metal stock cup-shaped to provide a cylindrical portion and an integral back wall, a sealing disc within the shell and against the back wall, a washer between which and the back wall the sealing disc is clamped adjacent its periphery, a closure forming a front wall for the shell, a spring disc within the shell and inwardly of the front closure, and the cylindrical portion of the shell being circumferentially grooved to present an internal bead between the washer and spring disc for clamping the spring disc adjacent its periphery and spacing it from the washer, the back wall, closure and discs having central openings for passage of a shaft, and the central opening in the sealing disc being normally smaller than the shaft whereby it is centrally inflexed by the shaft and is urged against the shaft by the spring disc, the central portions of the discs being flexed in the same axial directions.

9. An oil seal comprising, a cup-shaped shell formed of sheet metal to provide a cylindrical portion and a back wall, a sealing disc of resiliently flexible material within the disc and against the back wall, a washer lying against the front face of the disc adjacent its periphery, an internally extending bead in the cylindrical portion of the shell clamping the sealing disc and washer between the bead and back wall, a spring disc lying against the front face of the bead and spaced from the sealing disc, a front closure for the shell bearing against the spring disc adjacent its periphery, the front end of the cylindrical portion of the shell being turned inwardly to clamp the closure and spring disc against the bead, and central openings through the back wall, the closure and the discs for the passage of a shaft, the central portions of the discs being forwardly flexed.

LOUIS H. STEIN.